(12) United States Patent
Francois

(10) Patent No.: US 11,499,060 B2
(45) Date of Patent: Nov. 15, 2022

(54) LIQUID CAPSULE HAVING THERMOCHROMIC AND PHOTOCHROMIC PROPERTIES

(71) Applicant: The Swatch Group Research and Development Ltd, Marin (CH)

(72) Inventor: Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 1141 days.

(21) Appl. No.: 16/052,772

(22) Filed: Aug. 2, 2018

(65) Prior Publication Data

US 2019/0048211 A1 Feb. 14, 2019

(30) Foreign Application Priority Data

Aug. 9, 2017 (EP) ..................................... 17185561

(51) Int. Cl.
*C09D 5/26* (2006.01)
*C09K 9/00* (2006.01)
(Continued)

(52) U.S. Cl.
CPC ................ *C09D 5/26* (2013.01); *C08K 3/013* (2018.01); *C08K 5/01* (2013.01); *C08K 7/18* (2013.01);
(Continued)

(58) Field of Classification Search
CPC ........ C09K 11/025; C09K 11/00; C09K 9/00; C09D 5/22; C09D 5/26; C09D 5/29; C09D 5/32; C08K 3/013; C08K 7/18; C08K 5/01; G03C 1/002; G03C 1/73; G03C 1/72; G04B 47/068; G04B 19/32; G01C 11/12

See application file for complete search history.

(56) References Cited

U.S. PATENT DOCUMENTS

2014/0187668 A1 7/2014 Owen et al.
2016/0108309 A1 4/2016 Owen et al.
2017/0189880 A1 7/2017 Owen et al.

FOREIGN PATENT DOCUMENTS

EP  3 172 982 A1  5/2017
ES  2 645 297 A1  12/2017
(Continued)

OTHER PUBLICATIONS

European Search Report dated Feb. 20, 2018 in European Application 17185561.2, filed Aug. 9, 2017 (with English Translation of Categories of Cited Documents).

*Primary Examiner* — C Melissa Koslow
(74) *Attorney, Agent, or Firm* — Oblon, McClelland, Maier & Neustadt, L.L.P.

(57) ABSTRACT

The invention relates to a capsule comprising a shell containing a transparent and thermally conducting liquid, particles having a thermochromic coating and particles having a photochromic coating, the thermochromic particles being bulkier than photochromic particles, the liquid being such that, within a first range of temperatures, its density is greater than the density of the thermochromic particles and than the density of the photochromic particles, and such that, within a second range of temperatures greater than those of the first range, the density of the photochromic particles is less than the density of the liquid, which is itself less than the density of the thermochromic particles.

6 Claims, 1 Drawing Sheet

(51) Int. Cl.
  *G03C 1/73* (2006.01)
  *G03C 1/00* (2006.01)
  *G04B 47/06* (2006.01)
  *C09K 11/00* (2006.01)
  *C08K 3/013* (2018.01)
  *C08K 9/02* (2006.01)
  *C08K 5/01* (2006.01)
  *C08K 7/18* (2006.01)
  *G01K 11/12* (2021.01)
  *G03C 1/72* (2006.01)
  *C09D 5/22* (2006.01)
  *C09K 11/02* (2006.01)

(52) U.S. Cl.
  CPC .................. *C08K 9/02* (2013.01); *C09D 5/22* (2013.01); *C09K 9/00* (2013.01); *C09K 11/00* (2013.01); *C09K 11/025* (2013.01); *G01K 11/12* (2013.01); *G03C 1/002* (2013.01); *G03C 1/72* (2013.01); *G03C 1/73* (2013.01); *G04B 47/06* (2013.01); *G04B 47/068* (2013.01)

(56) References Cited

FOREIGN PATENT DOCUMENTS

| | | |
|---|---|---|
| GB | 2 431 159 | 4/2007 |
| JP | 5-61132 | 3/1993 |
| WO | WO 2017/191346 | * 11/2017 |

* cited by examiner

LIQUID CAPSULE HAVING THERMOCHROMIC AND PHOTOCHROMIC PROPERTIES

This application claims priority from European Patent Application No. 17185561.2 filed on Aug. 9, 2017; the entire disclosure of which is incorporated herein by reference

FIELD OF THE INVENTION

The invention relates to thermochromic components and to photochromic components, in particular applied to the field of watchmaking.

BACKGROUND OF THE INVENTION

Thermochromic capsules, which change colour reversibly when the temperature rises above or falls below a threshold value, are known. The patent document EP 0 602 537 A1 describes in particular a watch provided with a temperature-indicating device produced based on such capsules. The watch makes it possible to indicate the temperature of the environment in which it is found, independently of the fact that the watch is worn or not worn.

Photochromic capsules, which change colour reversibly in reaction to exposure to light rays, are also known. The patent document CH 710 489 describes in particular a watch provided with a bezel comprising indicators produced based on such capsules.

However, it would be advantageous to have available capsules which can have both thermochromic and photochromic properties.

SUMMARY OF THE INVENTION

The aim of the present invention is thus to provide a capsule exhibiting thermochromic properties and photochromic properties.

To this end, the invention relates to a capsule comprising a shell containing a transparent and thermally conducting liquid, particles having a thermochromic coating and particles having a photochromic coating.

In the first range of temperatures, the thermochromic particles and the photochromic particles are such that their densities are less than the density of the liquid. Thus, they are in suspension in the liquid. Since the thermochromic particles are bulkier than the photochromic particles, the predominant effect in the capsule is thermochromism.

In the second range of temperatures, which is higher than the first, the liquid has a lower density than in the first range. The thermochromic particles are such that their density is greater than the density of the liquid, whereas the photochromic particles are such that their density is lower than the density of the liquid. Thus, the thermochromic particles sink, whereas the photochromic particles remain in suspension: the predominant effect in the capsule is thus photochromism.

Other advantageous characteristics of the invention are described in the present disclosure. These characteristics can be considered independently or according to all technically possible combinations.

BRIEF DESCRIPTION OF THE FIGURES

Other distinguishing features and advantages will emerge clearly from the description which is made below thereof, by way of indication and without any limitation, with reference to the appended figures, representing.

DETAILED DESCRIPTION OF THE PREFERRED EMBODIMENTS

Figure 1:
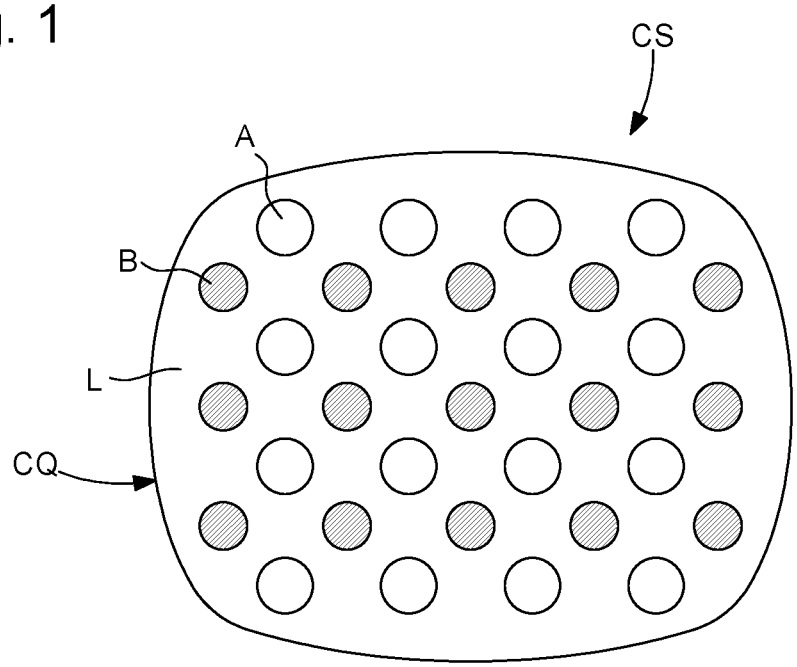
In FIG. 1, a capsule according to an embodiment of the invention, when its temperature lies within a first range of temperatures.
Figure 2:
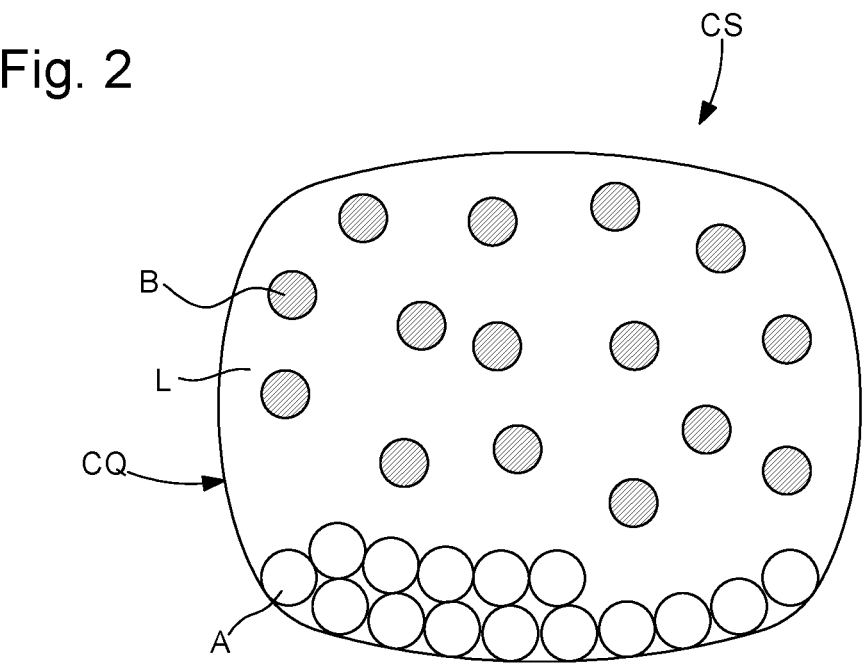
In FIG. 2, the capsule of FIG. 1, when its temperature lies within a second range of higher temperatures.

FIG. 1 represents a capsule (CS) comprising a transparent leaktight shell (CQ). The shell (CQ) includes a transparent liquid (L) which does not form a barrier to ultraviolet rays, which is thermally conducting and which has a high thermal expansion at a preferred temperature, which will be denoted Tx. It can, for example, be an oily mixture of a liquid paraffin having a melting point Tx and glycerol. The shell (CQ) also includes two types of particles. The first particles are coated with a thermochromic coating; they will be referred to as thermochromic particles (A). The second particles are coated with a photochromic coating; they will be referred to as photochromic particles (B). These particles are provided in the form of spheres and can thus more easily sink (in contrast to particles in strip form). The thermochromic and photochromic coatings are chosen so as to withstand the oily medium. They are also selected so as to have a coloured transition threshold which makes it possible to give advantageous information, in particular to a wearer of a timepiece or item of jewellery, in the case where the capsule is placed on a wall of said timepiece or item of jewellery. This information can be a temperature, a light intensity, a level of ultraviolet radiation dangerous to the health, and the like.

The thermochromic particles (A) and the photochromic particles (B) have, for example, a diameter of between 100 and 500 microns. Furthermore, the volume of the thermochromic particles (A) is greater than the volume of the photochromic particles (B). Finally, the density of the thermochromic particles (A) is higher than the density of the photochromic particles (B).

Within a first range of temperatures, for example between 0° C. and 10° C., the density of the liquid (L) is greater than the density of the thermochromic particles (A) and than the density of the photochromic particles (B). Thus, the thermochromic particles (A) and the photochromic particles (B) are in suspension in the liquid (L). However, the photochromic particles (B) are masked by the thermochromic particles (A), which have a larger volume and consequently a greater chromatic power. Thus, the dominant aesthetic effect in the capsule (CS) is thermochromism.

Within a second range of temperatures comprising higher temperatures than those of the first range, for example from 10° C. to 30° C., the liquid (L) has a lower density than that which it had in the first range of temperatures. The density of the liquid (L) is such that it is greater than the density of the photochromic particles (B) but lower than the density of the thermochromic particles (A). Thus, the thermochromic particles (A), which are denser, settle out, that is to say sink and are deposited at the bottom of the shell (CQ). On the other hand, the photochromic particles (B) remain in suspension. The dominant aesthetic effect in the capsule (CS) is thus photochromism.

It should be noted that, in one embodiment, the shell (CQ) additionally contains particles of a third type, photoluminescent particles, which make it possible to see coloured transitions by night.

Of course, the present invention is not limited to the example illustrated but is capable of various alternative forms and modifications which appear to a person skilled in the art.

What is claimed is:

1. A capsule comprising a shell containing a transparent and thermally conducting liquid, particles having a thermochromic coating and particles having a photochromic coating, the thermochromic particles being bulkier than photochromic particles, the liquid being such that, within a first range of temperatures, the density of the liquid is greater than the density of the thermochromic particles and than the density of the photochromic particles, and such that, within a second range of temperatures greater than those of the first range, the density of the liquid is greater than the density of the photochromic particles, and less than the density of the thermochromic particles.

2. The capsule according to claim 1, the liquid being an oily mixture of liquid paraffin and glycerol.

3. The capsule according to claim 1, the thermochromic particles and the photochromic particles being of spherical shape.

4. The capsule according to claim 1, the thermochromic particles and the photochromic particles having a diameter of between 100 and 500 microns.

5. The capsule according to claim 1, the shell additionally comprising photoluminescent particles.

6. A timepiece or item of jewellery comprising a wall comprising capsules according to claim 1 thereon.

* * * * *